April 21, 1964
J. RABINOW
3,129,798
CYLINDER CLUTCH
Filed May 29, 1961
2 Sheets-Sheet 1
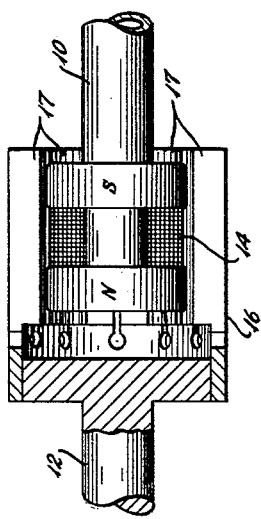
Fig. 1
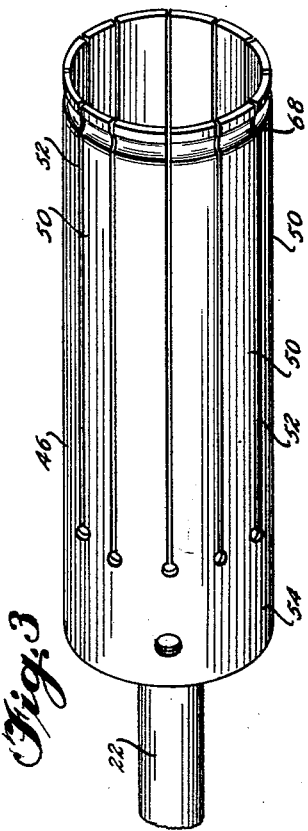
Fig. 3
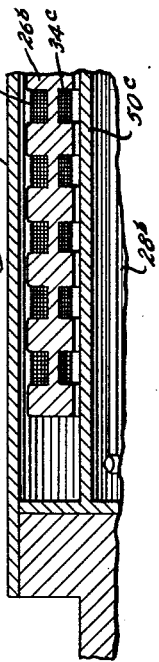
Fig. 5
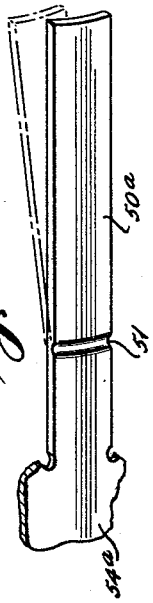
Fig. 4
Fig. 2
INVENTOR.
Jacob Rabinow
BY Joseph A. Genovese &
Max L. Libman
ATTORNEYS April 21, 1964   J. RABINOW   3,129,798
CYLINDER CLUTCH
Filed May 29, 1961   2 Sheets-Sheet 2
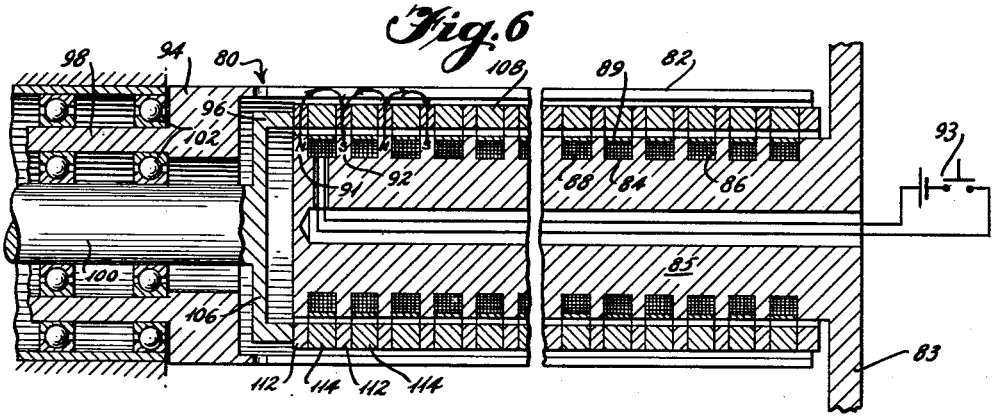
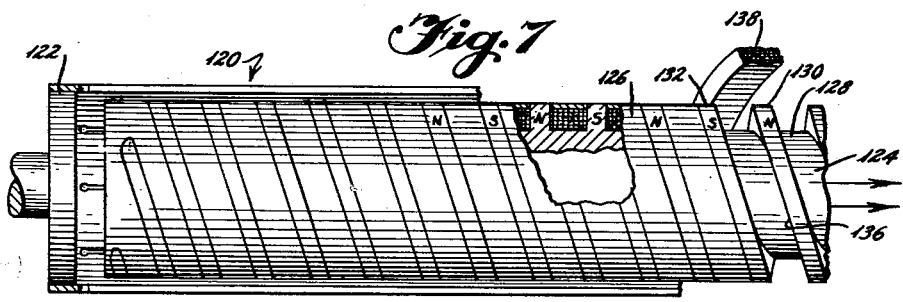
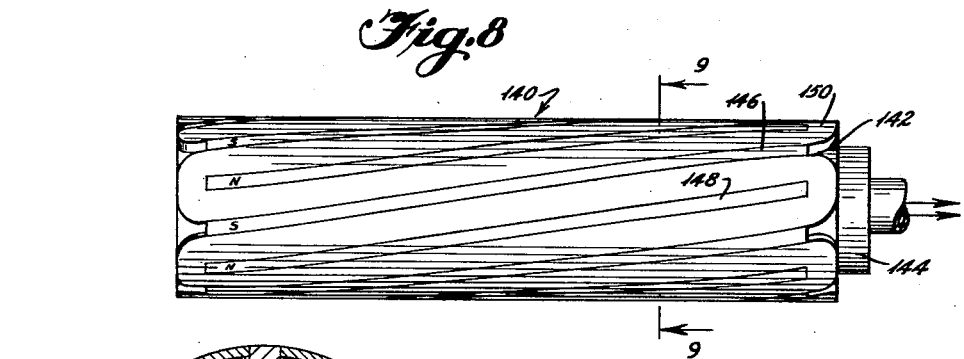
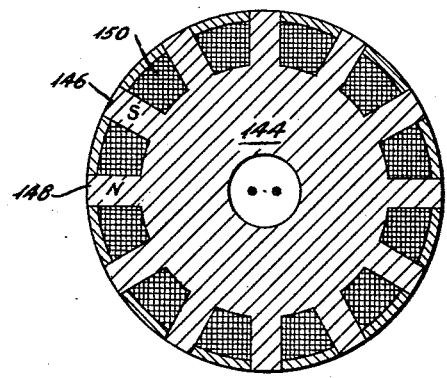
INVENTOR
Jacob Rabinow
BY Joseph A. Genovese &
Max L. Libman
ATTORNEYS

United States Patent Office 3,129,798
Patented Apr. 21, 1964

3,129,798
CYLINDER CLUTCH
Jacob Rabinow, Bethesda, Md., assignor to Rabinow Engineering Co., Inc., Takoma Park, Md.
Filed May 29, 1961, Ser. No. 113,348
13 Claims. (Cl. 192—84)

This invention relates to couplings and particularly to electromagnetic clutches or brakes.

Since the philosophical difference between a "clutch" and a "brake" is its ultimate use, the following description shall refer to "coupling" or "clutch." However it is understood that the possible uses of my invention as a "brake" are understood throughout.

The principal object of my invention is to provide an electromagnetic friction clutch of such configuration that a very large surface area is available for frictional contact, and yet the outer diameter is unusually small for the loads capable of being handled by the clutch.

Although there may be numerous modifications of my invention, basically, my coupling is composed of a pair of nested, cylindrical members. One member is an electromagnet having a large surface area with which the second member is engageable without relative axial movement of the members. The side wall of the second member is composed of a number of sections or fingers, each being flexible toward and away from the electromagnet (in response to radially directed electromagnetic forces), and inflexible when subjected to circumferential forces. The fingers are elastic so that they return to a neutral or normal position when the electromagnetic forces are discontinued. Accordingly, when the electromagnet is energized, the fingers are attracted to and held against the surface of the electromagnet. This frictionally couples the two members of the clutch. When the electromagnet is deenergized, the inherent elasticity of the fingers causes them to return to the decoupled position at which the fingers are slightly spaced from the electromagnet. The cylindrical configuration provides a comparatively large area for magnetic attraction and for frictional contact between the electromagnet and driven (or drive) member. In addition, the large areas involved effectively dissipate heat. To aid in heat dissipation, I may provide an air passage cooling system and/or cooling fins. When an air passage system is used, windage due to the rotation of the coupling, may induce the necessary air flow.

I am aware of many prior electromagnetic clutches which rely on a cylindrical drive member and/or a cylindrical driven member, with the members being electromagnetically released and/or coupled. However coupling is usually achieved by planar surfaces engaging each other, as shown in my prior Patent No. 2,732,921. There are other prior clutches where the coupling is achieved by engagement of inclined surfaces as in the Sperry U.S. Patent No. 1,137,804. However, I am unaware of any electromagnetic coupling which may be made compact and yet have large frictional-contact areas by relying on flexible fingers or the like, being attracted to an electromagnet to couple the drive and driven members of the clutch.

Generally, the design of an electromagnetic clutch is such that the armature or an intermediate member is axially movable to engage the clutch. This is to avoid having the part with the slip rings of the electrical system move axially. In some forms of my clutch there is no requirement for axial movement of either member or an intermediate member, thereby making selection of either member as the "driven" or "drive" member completely arbitrary. Thus, another advantage of my clutch is that it is more versatile, and eliminates all ordinary structural provisions usually provided to allow axial movement of one of the clutch members with respect to the other.

Accordingly, another object of my invention is to provide an electromagnetic coupling which relies on the movement of flexible fingers to frictionally engage the coupling and afford a large contact area between the driver and driven parts of the clutch.

Another object of my invention is to provide a coupling which has a copious frictional contact-area which automatically reduces the heat dissipation problems inherent in electromagnetic friction clutches.

A further object of my invention is to provide a windage cooling system to further aid in effectively dissipating the heat generated by high capacity, small diameter clutch.

A further object of the invention is to provide a coupling which is simple and comparatively inexpensive, and yet reliable and predictable in its operation.

A further object of the invention is to provide a coupling of a basic design which may, with minor variations, be used as a coupling type other than a friction clutch. For example, I may provide teeth or serrations on the fingers and the drive (or driven) part of the clutch to form an electromagnetic tooth clutch.

Other objects and features of importance will become apparent in following the description of the illustrated forms of the invention.

FIGURE 1 is a longitudinal sectional view of a coupling which illustrates the principles of the invention.

FIGURE 2 is a longitudinal sectional view of a specific coupling.

FIGURE 3 is a perspective view of one of the coupling members shown in FIGURE 2.

FIGURE 4 is a perspective view showing a modification of the fingers constituting a portion of the clutch of my invention.

FIGURE 5 is a fragmentary sectional view showing another embodiment of my clutch.

FIGURE 6 is a longitudinal sectional view showing another embodiment.

FIGURE 7 is a fragmentary sectional view showing another clutch.

FIGURE 8 is a fragmentary elevational view showing another modification of one of the rotating parts of my clutch.

FIGURE 9 is a sectional view taken on the line 9—9 of FIGURE 8.

FIGURE 1 discloses the principle of the invention. There are two members 10 and 12 respectively, representing drive and driven members or parts. Member 10 is a shaft which is provided with a cylindrical electromagnet assembly 14 at one end. Member 12 is also a shaft, and it is provided with a cylindrical device 16 having flexible sections or fingers 17 arranged as a cylinder. Coupling is achieved by attracting the flexible fingers against the surface of the electromagnet so that the confronting surfaces of electromagnetic assembly 14 and device 16 function as friction surfaces. When the electromagnet is deenergized, the inherent elasticity of sections 17 return the sections to a rest position slightly spaced from the outer surface of the electromagnet (FIGURE 1).

Attention is now directed to FIGURES 2 and 3. Coupling 18 has a first member 20 and a second member 22 which correspond to members 10 and 12 respectively of FIGURE 1. Electromagnet 24 is attached to or made part of member 20. The electromagnet is composed of a cylindrical metal core 26 having a central cavity 28 and an outer surface 30. The outer surface has circumferential grooves 32 accommodating windings 34 whose input leads 36 and 38 are energized from slip rings 40, 42 and brushes 41, 43. The windings (FIGURE 2) are recessed within the grooves 32 and are wound in such direction as to establish north and south poles between them when the windings are energized. A nonmagnetic wear resistant material 35 is over the windings in the grooves, and is flush with surface 30.

Device 46 (FIGURE 3) which corresponds to device 16 of FIGURE 1, is made of a base 48 secured to or made part of member 22, and a cylinder composed of a plurality of fingers or sections 50 (FIGURE 3), each separated from each other along its length by slots 52. The fingers have a collar 54 at their inner ends, and the collar is secured to base 48 by any method or means. Alternatively, the fingers may be made discrete (not shown) and fastened in notches in base 48.

The fingers are flexible and elastic, so that after they are deflected they return to the initial rest position upon removal of the deflection force. The fingers flex toward and away from surface 30 of electromagnet 24, but are highly inflexible to torsional forces, i.e., forces in the direction circumferentially of device 46. As shown in FIGURE 4 the fingers 50a may be scored or thinned as at 51 near collar 54a to establish a hinge axis for the flexing of the fingers.

Coupling 18 is of such design that it is easily air cooled. By providing passages 53 at the ends of base 48 and core 26, windage generated by coupling rotation cools the coupling. The passages 53 are air inlets with the air circulating through cavity 28 and out of slots 52. I also provide ports, as at 55, in the side walls of core 26 so that the air flows through and around the core, to be discharged through the slots 52 and any additional ports (not shown) which I may elect to provide in the fingers themselves.

In practical use and operation, coupling 18 is operatively connected to a power input device (not shown) and a power output device (not shown) by attachment of shafts 20 and 22 respectively thereto. When it is desired to transmit power between the power input and power output devices, electromagnet 24 is energized. I have diagrammatically shown a circuit 62 provided with a switch 60 and operatively connected with brushes 41 and 42 to disclose how the circuit connections are made. When the circuit is closed, magnetic forces of the electromagnet pull the fingers against the electromagnet surface 30, thereby frictionally coupling members 24 and 46.

The fingers of device 46 are long in comparison to their thickness and width. Thus, they are capable of readily flexing toward and away from the electromagnet by bending about their smallest dimension. Since each finger is of substantial width, the fingers are highly resistant to torsional forces tending to move or distort the fingers circumferentially of device 46. Although coupling 18 has fingers 50 disposed on the exterior of the electromagnet, as an alternative (not shown except as part of FIGURE 5), the fingers may be disposed within cavity 28. In fact, I may use (FIGURE 5) inner and outer sets of coils 34b and 34c on core 26b and two sets of fingers 50b and 50c. One set is disposed on the exterior of core 26b whereas the second set of fingers 50c is disposed within cavity 28b of the core. In this form (FIGURE 5), the two sets of fingers would operate simultaneously, or I may have one set of fingers, e.g. fingers 50b, stiffer than the other set thereby automatically stepping the engagement of the coupling when the electromagnet is energized. For special purposes, this feature has several advantages. For instance, the electromagnet may be used as the drive member, and the driven member may be made as a pair of concentric shafts with one set of fingers connected to one shaft and the other connected to another shaft. The concentric shafts would then be sequenced, i.e. operated one after the other for any reason, such as having the initially operated shaft operate a first utilization device, and the second output shaft operate another. Also, one set of fingers could be made to operate when a low current is applied to the electromagnet, and the other set when the current is increased.

Although I have considered member 20 with its electromagnet 24 as the "drive" member, it may with equal facility be the "driven" member, with member 22 being the "drive" member. In such an arrangement, the particular application of the clutch may require that member 46 be rotated uncoupled from the electromagnet 28 at high speeds. To prevent the fingers from flexing radially outwardly due to centrifugal force, and to preserve the close spacing between the surfaces of device 46 and core 26, member 22 may use a garter spring 64 (with or without the concentric restraining ring 66 shown in FIGURE 2) on the exterior of the fingers near their outer ends. The garter spring may be disposed in a circumferential groove 68 at the outer ends of fingers 50, or simply held in place by abutments on the fingers 50. As an alternative, the spring may be substituted by a ring or the equivalent.

The clutch 80 shown in FIGURE 6 has a set of flexible fingers 82 similar to the fingers of FIGURE 3. The elastic, resilient finger feature is similar in each form of my clutch. However, clutch 80 distinguishes from the previously described clutches in that it requires no electrical slip rings and may be stationarily mounted, for instance by flange 83. The electromagnet assembly 84 is fixed to flange 83, and consists of a hollow core 85 fixed to flange 83 and having grooves 86 in its cylindrical surface. Field coils 88 are recessed in grooves 86, and they are covered with a potting material filler 89, for instance an epoxy resinous compound. The filler is ground or otherwise made flush with the surface of the cylindrical core. The windings 88 are such that alternate pole pieces, for instance pole pieces 91 and 92 are north and south poles when the windings are energized, e.g. by closing the switch of circuit 94 which is the same as circuit 62 in FIGURE 2.

The two rotating parts or members 93 and 96 of the clutch have concentric shafts 98 and 100 supported on bearings 102 so that they are capable of rotating with respect to each other. The rotating member 94 is formed with a plurality of fingers 82, mentioned previously, which are identical to the previously described fingers 50. However, the rotating part or member 96 is different from all others described heretofore. The shaft 100 has a spider or cup 106 at one end which supports a cylindrical flux-transfer device 108 concentric with the group of fingers 82 and the electromagnet assembly 84, and is located between them. The flux transfer device is made of alternate layers of highly permeable material and non-permeable material, e.g. brass or aluminum. The permeable rings 112 may be soft iron or steel and they are narrow in comparison to the non-permeable rings 114. As shown in FIGURE 6 the rings are alternately joined together, e.g. brazed, and they are proportioned to fit directly opposite the pole pieces 91, 92, etc., and the coils or windings 88 respectively. More particularly, the non-permeable rings oppose the windings, and the permeable rings 112 oppose the pole pieces of the electromagnet assembly. This arrangement allows the permeable rings 112 to conduct the flux when the electromagnet is energized and they do not allow the flux to shunt between pole pieces. Instead, the flux follows a path as shown by the heavy lines in FIGURE 6 so that the fingers are in flux-linkage with the electromagnet through the transfer device 108. Accordingly, when the circuit 93 is energized, the fingers are attracted to the flux transfer device 108 thereby coupling the concentric shafts 98 and 100 to which input and output loads (not shown) of utilization devices may be attached by any conventional means.

The clutch 120 (FIGURE 7) is quite similar to the clutch shown in FIGURE 2. It has rotatable members 122 and 124 with the rotatable member 122 being for all practical purposes, identical to the member shown in FIGURE 3. The distinguishing feature of the clutch in FIGURE 7 is in the construction of the electromagnet assembly 126 on member 124. Electromagnet 126 is composed of a cylindrical core 128 having a double-thread lead screw configuration. The threads 130 and 132 respectively, are uniformly spaced from each other along the length of the core 26 to define a spiral groove 136 to accommodate windings 138. Here again, after the windings are located between the north and south pole-forming spiral members, the electromagnet assembly is preferably potted. The electrical circuit connections are made in clutch 120 the same as in the other clutches, for instance the clutch in FIGURE 2, where both parts are rotatable.

The core 128 and pole-forming members 130 and 132 may be made by any manufacturing technique, one of which is simple machining. However, this form of my invention is well suited for another method of assembly where the pole-forming members 130 and 132 are constructed of a large number of stamped rings with peripheral projections. The rings are placed on a core piece and the rings are twisted until the projections form the double-thread. In such a manufacturing method the rings would form a laminar construction.

FIGURES 8 and 9 show another clutch 140 which is very similar to clutch 120, with the exception that the pitch of the screw is made very much larger. The electromagnet (armature assembly not shown in FIGURES 8 and 9) assembly 142 consists of a core 144 having curved pole pieces 146 and 148 rising from the cylindrical surface of the core. The curvature is slight, as shown, and the pole pieces are alternately north and south, made so by the arrangement and energization of the windings 150. In this form of my clutch the windings may be elongate closed loops and fitted around the individual pole pieces, after which the entire assembly is potted. The operation of the clutch of FIGURES 8 and 9 is the same as the operation of the clutches shown in FIGURES 2 and 7.

It is understood that various changes and modifications other than those specifically mentioned and/or illustrated may be made without departing from the protection of the following claims.

I claim:

1. An electromagnetic coupling comprising a cylindrical electromagnet provided with a surface, and a cylindrical device having a plurality of flexible elastic fingers provided with inner ends, said fingers being of a length at least twice the diameter of said device and flexible from the inner end of each finger to move easily toward and away from said electromagnet, said electromagnet and device being nested, means for energizing said electromagnet and thereby magnetically attracting the fingers and flexing them against the electromagnet to establish a frictional drive connection between the electromagnet and said device.

2. A coupling providing large first and second surface areas for frictional contact in comparison to the diameter of the coupling, said coupling comprising means forming an elongate electromagnet provided with a first cylindrical surface constituting said first area, an elongate device having a cavity in which said electromagnet is disposed, said elongate device having a plurality of spring members defining said cavity and the second of said frictional surface areas, said members being attracted to said first surface area when said electromagnet is energized, the electromagnetic attraction bringing and holding said areas in engagement to establish a drive connection between the electromagnet and said device, the normal position of said members being spaced from said cylindrical surface, and each of said members being flexible toward and away from the electromagnet and inflexible in a direction tending to move said members sideways toward each other.

3. An electromagnetic coupling comprising a first member, an electromagnet secured to said first member, a second member, a coupling device secured to said second member, said device and electromagnet being nested and having surfaces normally radially spaced from each other, said device having a plurality of fingers and a base, said fingers being elastic and flexible with respect to said base in a direction toward and away from said electromagnet surface in response to energization of the electromagnet, thereby drivingly connecting the electromagnet and said device, and the elasticity of said fingers returning said fingers to a rest position spaced from the electromagnet when the electromagnet is de-energized.

4. The coupling of claim 3 wherein said fingers are spring metal.

5. An electromagnetic clutch comprising a first member having an elongate cylindrical electromagnet providing a comparatively large surface area, a second member composed of a base having a plurality of elongate elastic fingers arranged as a cylinder with which said electromagnet is nested, said fingers also providing a large surface area confronting but normally spaced from the surface area of said electromagnet, said fingers being flexible toward said electromagnet upon energization of the electromagnet to engage said areas and establish a drive connection between the electromagnet and second member, the inherent elasticity of said fingers returning said fingers to a position slightly spaced from the electromagnet when the electromagnet is de-energized, and restraining means normally engaging said fingers to prevent said fingers from excessively spreading upon rotation of said second member.

6. An electromagnet coupling of small diameter and comparatively high loading capability, said coupling comprising a first member having a cylindrical elongate electromagnet including a core with windings on the core, said core having a central cavity, a second member provided with a plurality of elongate spring fingers arranged cylindrically and nested within said core, said fingers being magnetically attracted against the surface of said core in response to energization of the electromagnet thereby establishing a drive connection between said electromagnet and said fingers.

7. The subject matter of claim 6 wherein said second member has a second set of fingers also nested with said electromagnet and attracted thereto in response to energization of the electromagnet.

8. The subject matter of claim 7 wherein one set of said fingers are more flexible than the others.

9. The subject matter of claim 6 wherein said fingers are separate and at least slightly circumferentially spaced from each other to provide freedom of movement of said fingers when they are electromagnetically attracted in a radial direction to the electromagnet and also to provide air passageways, and means defining an additional air conductor in registry with the central cavity of said core to cooperate with the spaces between said circumferentially spaced fingers for forming an air circulatory system for the coupling.

10. An electromagnetic friction clutch comprising a cylindrical electromagnet assembly, a pair of rotatable members, said rotatable members having portions which are concentric with said electromagnet assembly, one of said portions composed of a plurality of resilient fingers adapted to be attracted toward the electromagnet assembly when the electromagnet assembly is energized, and the other of said portions constituting a flux transfer device which places said fingers in flux-linkage with the electromagnet assembly and thereby frictionally engage said fingers with said transfer device.

11. The clutch of claim 10 wherein said flux transfer device and said electromagnet assembly are slightly spaced along confronting areas thereof, said transfer device and assembly each including a plurality of magnetically highly permeable members slightly spaced and directly opposite each other, the permeable members of said electromagnet assembly being longitudinally spaced from each other to provide a groove for windings of the electromagnet assembly, and said flux transfer device having low-permeability members opposite said windings to provide a high reluctance path for the lines of flux and require the flux to be transferred through the highly permeable members of said transfer device to said fingers.

12. An electromagnet friction clutch comprising a first member having a plurality of resilient fingers arranged substantially cylindrically, a second member nested with said cylindrically arranged fingers, an electromagnet assembly connected with said second member and concentric with said fingers so that upon energization of said electromagnet assembly said fingers are magnetically attracted toward and frictionally contact said second member.

13. An electromagnetic coupling comprising a first coupling member including a cylindrical electromagnet, a second coupling member having a base and a plurality of spring fingers connected to said base, said spring fingers arranged to form a cylinder and being nested with said first coupling member, said fingers engaging said first member when the electromagnet is energized, each spring finger having a length dimension greater than its width and being flexible along its length from its connection with said base and in a radial direction with respect to said first coupling member, and each of said spring fingers being substantially inflexible when subjected to the torsional forces to which it is subjected when engaged with said first coupling member to establish engagement between said first and second coupling members.

References Cited in the file of this patent

UNITED STATES PATENTS

| | | |
|---|---|---|
| 1,746,365 | Schunemann | Feb. 11, 1930 |
| 1,886,692 | Kapitza et al. | Nov. 8, 1932 |
| 2,344,111 | Ryba | Mar. 14, 1944 |
| 2,568,824 | Rahbek | Sept. 25, 1951 |
| 2,841,258 | Jewell | July 1, 1958 |
| 2,946,418 | Leeson | July 26, 1960 |
| 2,966,977 | Johnson | Jan. 3, 1961 |